United States Patent Office

PTO - BOYERS, PA Duty Station

MISSING PAGE TEMPORARY NOTICE

PATENT # 7499X FOR ISSUE DATE 3-25-1833 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Drawings

Data Conversion Operation

Boyers, Pa

7499X

UNITED STATES PATENT OFFICE.

HENRY SPIEHLMAN AND DANIEL MILLER, OF LANCASTER COUNTY, PA.

IMPROVEMENT IN PLOWS.

Specification forming part of Letters Patent dated March 25, 1833.

*To all whom it may concern:*

Be it known that we, HENRY SPIEHLMAN and DANIEL MILLER, of the county of Lancaster, State of Pennsylvania, plow-makers, have invented a new and useful Improvement in Common Plows; and we do hereby declare that the following is a full and exact description of the construction and operation of the said improvement as invented or made by us, which consists in the shape and construction of the mold-board, the plate by which it is fastened to the plow, and a plate on the landside of the plow, all of which are generally made of cast metal.

From the point to the heel of the mold-board is two feet, which being at this place set perpendicular and a line drawn from the one to the other of the points, the curve of the mold-board on the spear side of this line would at the widest place (which would be ten and one-fourth inches from the fore end and thirteen and one-fourth from the hind end) be two and three-eighth inches, and from this gradually lessening to each extremity, and the curve of the mold-board on the land side of this line would at the widest place, which is opposite to this same point, be four inches and lessening toward each end. The mold-board at the place where the curve is mentioned to be the widest is concave about eleven-sixteenths of an inch and lessens toward the heel. From the heel to the hind end of the share is sixteen inches, and rising from a horizontal line eight and a half inches, which would be at an angle of thirty-one degrees, and leans over to the share side about two inches and three-quarters from the one extreme to the other. Here it is concave one inch and three-eighths. Eleven inches and a half of the lower is concave, and two inches and a quarter of the top bevels off toward the plow about seven-eighths of an inch, is intended to strengthen the mold-board. At the hind end the mold-board is about three inches in width. A piece of cast metal of about the thickness of three-eighths of an inch, ten inches long, three inches and a half broad at the upper end, three and one-eighth inches in the middle, and four and five eighths inches broad at the lower end, curved on the one side to fit the mold-board, with a projection of two inches near each end, beveled at an angle of about forty-five degrees, so that when the straight edge of the plate is riveted fast against the front of the sheth those projections fit to the slope of the mold-board, and by means of bolts and screws through these projections and the handle of the plow the mold-board is made fast. A thin plate of cast metal, nearly the length of the bar of the share, and fitted to the top of the bar on the one side, is about seven and a quarter inches broad at the heel, and continues that breadth nine or ten inches, and then tapers to a point near the point of the share, is set on the bar of the share and fastened to the plow on the land side, and is of advantage in making the plow run smooth and clean.

In testimony that the above is a true specification of our said improvement we have hereunto set our hands.

March 18, 1833.

HENRY SPIEHLMAN.
DANIEL MILLER.

Witnesses:
SAML. DALE,
SAMUEL F. DALE.